KEYING ARRANGEMENT FOR SINGLE BEAM COLOR TUBE

Filed Dec. 18, 1951 2 Sheets-Sheet 1

INVENTOR
Nathan Rynn
BY
[signature]
ATTORNEY

May 8, 1956 N. RYNN 2,745,037

KEYING ARRANGEMENT FOR SINGLE BEAM COLOR TUBE

Filed Dec. 18, 1951 2 Sheets-Sheet 2

INVENTOR
Nathan Rynn
BY
ATTORNEY

United States Patent Office 2,745,037

Patented May 8, 1956

2,745,037

KEYING ARRANGEMENT FOR SINGLE BEAM COLOR TUBE

Nathan Rynn, Princeton, N. J., assignor to Radio Corporation of America, a corporation of Delaware Application December 18, 1951, Serial No. 262,272

8 Claims. (Cl. 315—30)

This invention relates to improvements in apparatus for linearly adding a keying wave to video signals and for applying the combination to the grid of a color kinescope employing a single beam of electrons.

If the video signals applied to the control grid of the color kinescope sequentially represent the intensity of the different primary colors as a line of the raster is being scanned means must be provided for keying the beam when it strikes a phosphor that emits a light corresponding to the color represented by the signal at that particular time. It has previously been suggested that the keying can be accomplished by biasing the control grid or the cathode of the electron gun beyond cut-off and by mixing a keying signal that is properly phased with the video signals applying this combination to the control grid. The keying signals are of sufficient amplitude to overcome the cut-off bias during relatively short uniformly spaced instants of time. Any video signal present during these instants of time further increase the intensity of the beam so that the colors reproduced by the phosphors have intensities corresponding to the signals.

It is the primary object of the present invention to provide improved means for coupling the keying signals and the video signals to the control grid of a color kinescope.

It is a further object of the invention to provide an improved means whereby the keying signals and video signals may be combined without undesired interaction between them.

These objectives may be attained by employing the distributed capacitances of the control grid as a functional part of the coupling circuit and by employing coupling circuits for the video signals and the keying signals that are mutually exclusive.

The manner in which this is done will be better understood after a detailed consideration of the drawings in which.

Figure 1:
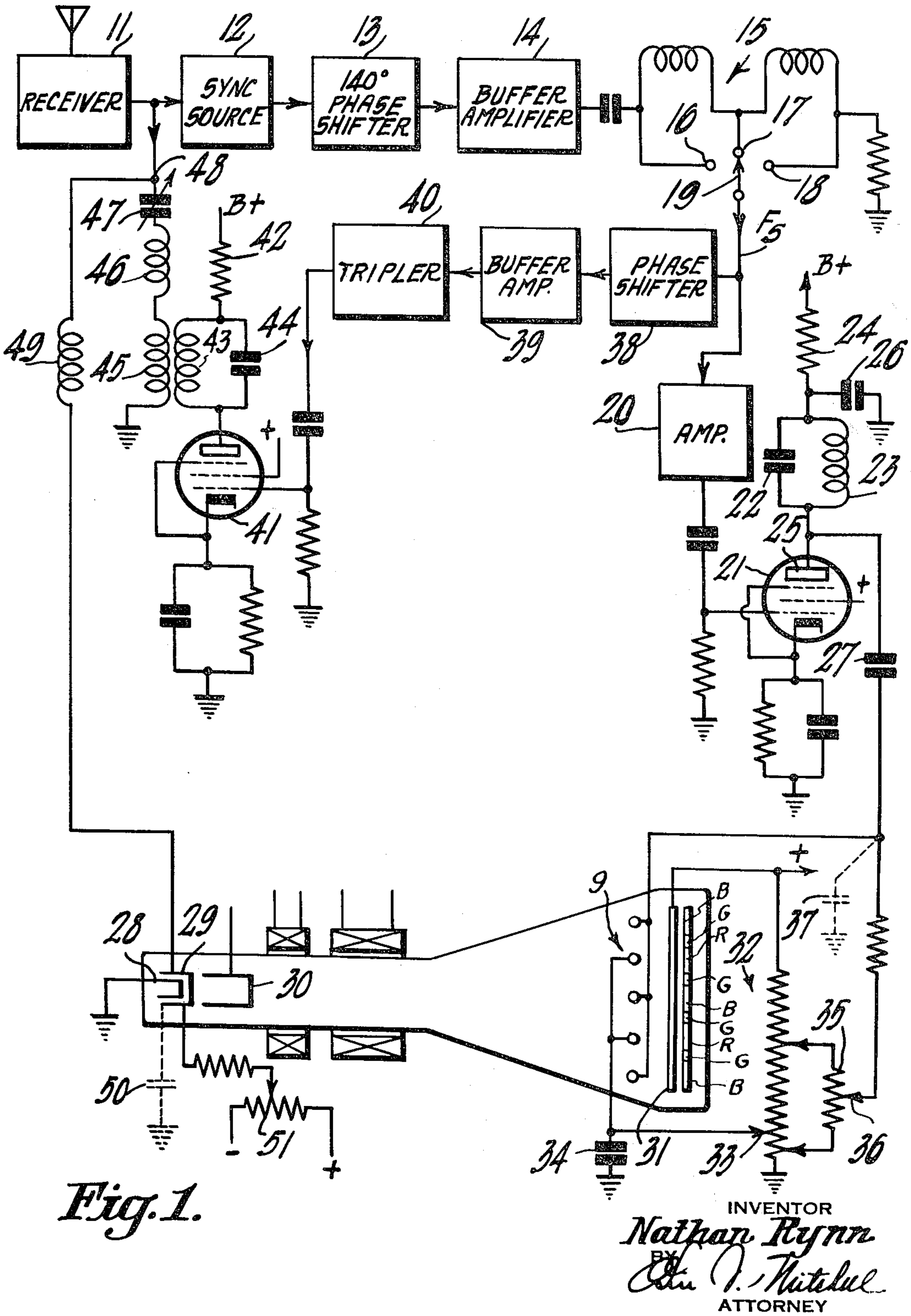
Figure 1 illustrates a color reproducing system having one embodiment of this invention.

In order that this invention may be more clearly understood, the following description of one form of receiving system with which it may be employed is presented.

The transmitted signal may represent the color and the intensity of a scanned scene in a variety of ways. A receiver 11 derives video signals from the transmitted wave that successively represents the intensity of each of the primary colors employed. It will be apparent that this receiver must be constructed in accordance with the type of signal transmitted. If the transmitted signal simultaneously represents each of the primary colors employed, then, as will be understood by those skilled in the art, the receiver 11 must be provided with means for sampling successively each of the color signals. If, on the other hand, the transmitted signal is such as to successively represent the intensity of the primary colors employed, then the receiver 11 merely detects the signal in the ordinary way. In the embodiment shown in Figure 1 it will be assumed that the transmitted signal itself successively represents the intensity of the primary colors as the scene televised is being scanned. Therefore the transmitted signal will also include a synchronizing component which may be employed in a manner to be described to control the rate at which the image reproducing means switches from one primary color to another. If the rate of change of the primary colors is large in comparison with the line scanning frequency the synchronizing component may be a burst of alternating current energy that is placed on the back porch of the line blanking pulse. This burst of color synchronizing frequency may be separated from the signal supplied by the receiver 11 by a source 12 in a manner described in "RCA Bulletins on Color Television and UHF, October 1949 to July 1950." Although the particular manner in which this burst of synchronizing energy is separated does not form a part of this invention and although one way of performing this separation may be found in the above publication, a method of performing the separation will now be described in the interest of clarity.

A unistable multivibrator may be triggered by either the leading or trailing edge of the horizontal sync pulses that are separated out in any well known fashion by the synchronizing circuits of the receiver 11. The components of the unistable multivibrator may be so adjusted that it puts out a pulse during the time the burst is present in the output of the receiver. The output of the receiver including both the synchronizing components normally employed in television, the burst of color synchronizing energy and the video components may be applied to a normally closed gate circuit of any well known type. The pulses supplied by the unistable multivibrator may then be applied to the gate circuit so as to render it capable of passing signals only during the time that the burst of color synchronizing energy is present.

The separated burst of color synchronizing energy is then applied to any well known type of phase shifter 13 that is capable of shifting the phase of the burst gradually up to approximately 140°. After passing through a buffer amplifier 14 and the phase shifter 13, the burst is applied to a phase shifter or splitter 15 that supplies the burst at phases separated by 120° to output terminals 16, 17 and 18. It can be seen therefore that the phase of the color synchronizing bursts may be rotated through 360° by selecting the output of the phase shifter 15 with the movable switch 19 and by adjusting the phase shifter 13. The movable switch 19 is connected to an amplifier 20 that is in turn coupled to a grid of an amplifier tube 21. A parallel circuit comprised in part of a condenser 22 and an inductance 23 is connected in series with a resistor 24 between the plate 25 of the amplifier tube 21 and a source of B+ potential. A bypass condenser 26 is connected to the junction between the resistor 24 and the parallel combination of the condenser 22 and the inductance 23 so as to effectively place this junction at ground potential at the color synchronizing burst frequency. The tube 21 therefore may be considered as a means for producing a voltage wave having the frequency of the burst across the inductance 23. This voltage appears at the plate 25 and is coupled by a condenser 27 to the color switching electrode or electrodes of the cathode ray tube employed to reproduce the images in color.

The particular color reproducing tube shown in Figure 1 may be described as follows. A series of horizontal strips of phosphors is mounted at one end of the tube. These strips may have various widths but as indicated by the letters in the drawing each adjacent strip produces a different primary color. Different sequences of the different color strips may be possible but the particular construction of the tube is not a part of this invention. An electron gun comprised of a cathode 28, a control grid 29 and an accelerating anode 30 serves to direct a beam of electrons toward the phosphor strips. A grid 9 comprised of a series of parallel and horizontal grid wires is mounted between the gun and the phosphor strips. In the particular arrangement shown it will be seen that each grid wire is parallel to the center of either a blue or red phosphor strip and that the green phosphor strips lie midway between adjacent grid wires. In between the grid and the phosphor strips is placed a conducting surface 31. A potentiometer 32 provides a convenient source for setting the direct current potentials of the grid wires of the conducting surface at the desired values. A more positive end of the potentiometer is connected to the conducting surface 31. The grid wires centered on the red phosphor strips are electrically coupled together and this set of grid wires is connected to a movable contact 33 of the potentiometer. A condenser 34 serves to connect this set of grid wires to ground at frequencies of the order of the color switching frequency. It will be noted that another potentiometer 35 is connected in parallel with the portion of the potentiometer 32 to which the movable contact 33 is applied. The movable contact 36 of the potentiometer 35 is connected to the set of grid wires that are centered on the blue phosphor strips. It will therefore be noted that after the electrons pass through the grid wires they are accelerated because the conducting surface 31 is more positive.

The color switching frequency Fs supplied by the amplifier 21 is coupled to the set of grid wires opposite the blue phosphors and accordingly the amplifier 21 and its associated circuitry may be termed a means for introducing a voltage variation between the two sets of grid wires at the color switching frequency. When this voltage passes through its axis the electrons pass straight through the grid and impinge upon the green strips of phosphor. When, however, the voltage is such as to make the set of grid wires opposite the blue phosphor strips positive with respect to the set of grid wires opposite the red phosphor strips the electrons are directed towards the blue phosphor strips and away from the green and red phosphor strips. In a similar fashion, when the color switching voltage supplied by the amplifier 21 makes the set of grid wires opposite the blue phosphor strips negative with respect to the set of grid wires opposite the red phosphor strips, the electrons are directed towards the red phosphor strips and away from the blue and green phosphor strips. The reason for this is that the electrostatic fields set up by the grid wires and the conducting surface 31 form cylindrical lenses between adjacent grid wires and the changing in the relationship shown between these adjacent grid wires causes the axis of the lens to tilt one way or the other.

In the drawing of Figure 1 the number of phosphor strips and consequently the number of grid wires has been greatly reduced in order that the structure may be clearly delineated, but it will be understood that in a practical embodiment of this tube that many more grid wires and phosphor strips will be employed. Therefore, in the practical case the grid wires are closer together and the distributed capacity between one set of grid wires and the other is greatly increased. Furthermore, the distributed capacity between the grid wires and other elements of the tube and also to ground is also increased. For purposes of simplicity all of this distributed capacity has been indicated by the dotted capacitor 37 that is shown as existing between one set of grid wires and ground. Therefore, these capacities are effectively in parallel with the condenser 22 and the inductance 23 that are in the plate circuit of the amplifier 21. Ordinarily these distributed capacitances indicated by the dotted condenser 37 would load down the amplifier 21 at the color switching frequency. As has been already described and claimed in my copending application, Serial No. 262,271, filed December 18, 1951, if the value of the inductance 23 and the condenser 22 are properly selected, the parallel circuit formed by them and the distributed capacitances may be tuned to parallel resonance at the color switching frequency. It will be understood by those skilled in the art that the condenser 22 might be dispensed with depending upon the size of distributed capacitances 37. The important fact however is that the distributed capacitances are placed in parallel with the RF load circuit of the amplifier 21 and the RF load circuit is so adjusted as to produce parallel resonance at the color switching frequency.

Figure 2:
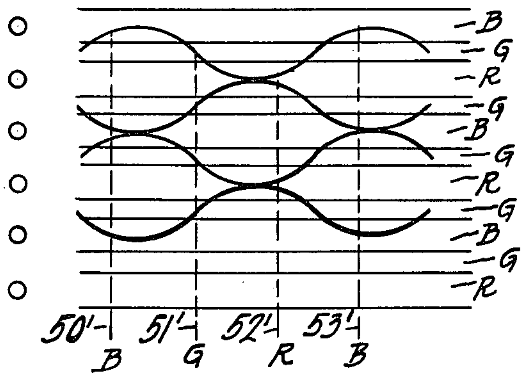
Figure 2 illustrates the operation of the particular color reproducing tube shown in Figure 1.

If the color switching frequency is of sinusoidal form, the sections of the electron beams passing between the grid wires trace sinusoidal paths on the phosphor strips as indicated in Figure 2. Owing to the fact that the sections of the beam passing the grid wires are of finite size it is necessary that the beam be keyed whenever these sectional beams are wholly within the confines of a single phosphor strip. This can be accomplished as follows. The output of the phase shifter 15 was applied to the amplifier 20 and to the color switching grid as previously described. This same output is also applied via phase shifter 38 and a buffer amplifier 39 to a frequency tripler 40 so as to form a keying wave 3Fs.

The present invention relates to the manner in which the keying wave 3Fs is combined with the video signals appearing at the output of the receiver 11. The keying wave is applied to the control grid of an amplifier 41. The plate of the amplifier is coupled to B+ by a resistor 42 that is in series with a parallel combination of an inductance 43 and a condenser 44. Another inductance 45 that is magnetically coupled to the inductance 43 is connected in series with a series resonant circuit comprised of an inductance 46 and a variable condenser 47 and this entire series combination is connected between ground and an output terminal 48 of the receiver 11. The values of the condenser 47 and the inductance 46 are selected so as to be at resonance at the frequency of the keying wave 3Fs. The output terminal 48 is connected to the control grid 29 of the color kinescope by an inductance 49. The distributed capacity between the control grid and ground is illustrated by the dotted capacitor 50. The value of the inductance 49 is chosen so that it is in series resonance with the distributed capacitance 50 at the frequency of the keying waves.

The operation of this coupling circuit is as follows. Due to the resonance of the inductance 49 and the distributed capacitance 50 at the keying frequency, the keying waves appear across the distributed capacity 50 and hence between the cathode and grid of the kinescope with a substantial amplitude. The grid 29 is biased to such an amount beyond cut-off by a potentiometer 51 that only a small portion of the positive crests of the keying wave reach the cut-off bias. The video signals are so polarized that they drive the grid in a positive direction and cause a proportional increase in the beam intensity. The series tuned circuit comprised of the condenser 47 and the inductance 46 presents a low impedance to the keying waves but it presents a high impedance to the video signals. Therefore, the video signals do not affect the source of keying waves. The series circuit comprised of the inductance 49 and the distributed capacitance 50 is also resonant at the frequency of the keying waves and therefore it prevents the keying waves from reaching and adversely affecting the source of video waves in the receiver 11. Thus the source of video waves and the source of keying waves are mutually exclusive as far as the effect of one on the other is concerned. At the same time the keying waves are applied with a substantial amplitude between the grid and cathode of the kinescope owing to the series resonance of the inductance 49 with the distributed capacity 50. At the same time the inductance 49 presents a low impedance to the video signals so that they reach the grid 29 without substantial loss in amplitude.

The overall operation of the apparatus shown in Figure 1 will be discussed in connection with Figure 2. As previously stated the sections of the electron beam passing between adjacent grid wires will strike the green phosphor strips that are centered between each adjacent pair of grid wires when the switching voltage applied to one set of the grid wires passes through its axis. Furthermore when the one set of grid wires is positive with respect to the other the beam is attracted to the phophor behind the positive grid wires. The timing of the keying signals applied to the grid 29 in the manner just described is controlled by the adjustment of the phase shifter 38. If this time is not properly controlled it can be seen that the sequence with which the different primary colors are produced would reverse itself in each successive group of primary colors. However, if the phase shifter 38 is properly adjusted, the same sequence of reproduction of the primary colors may be obtained across the whole line of the raster. In the particular arrangement shown the positive crest of the keying wave 3Fs occurs at 60°, 180° and 300° of the color switching wave. The sinusoidal waves shown in Figure 2 are of the frequency corresponding to the color switching wave Fs and with the keying waves having a frequency 3Fs, the beam is turned on when it reaches any one of the vertical dotted lines 50′, 51′, 52′ and 53′. It will be realized of course that only a small horizontal portion of the phosphor strips is shown. It will be noted that when the beam is turned on at a position indicated by the dotted line 50′ that all the sectional beams passing through the gate structure strike blue phosphor strips and that when the beam is turned on at a time indicated by the dotted line 51′ all of the sectional beams passing through the grid structure strike the green phosphor strips. In a similar way when the beam reaches the positions 52′, and 53′, the red and blue strips are respectively struck by the sectional beams passing through the grid.

Figure 3:
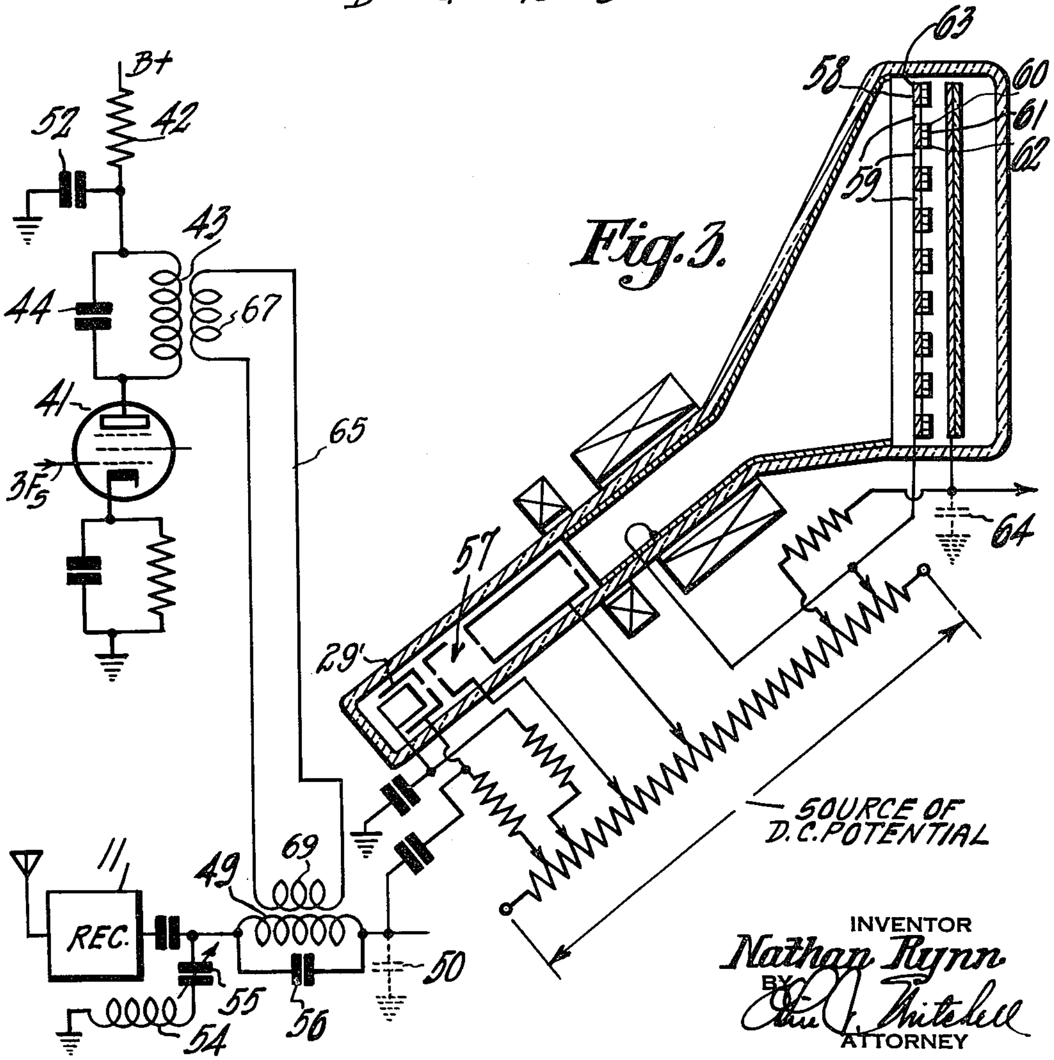
Figure 3 illustrates another embodiment of this invention in conjunction with the different type of color reproducing tube.

Figure 3 illustrates another embodiment of the invention employing link coupling between the source of keying waves and the grid of a color kinescope. In addition, a different type of kinescope is shown. It is a 45° reflection-type color kinescope which is described in greater detail in an article appearing in the "RCA Review," September 1951, beginning at page 503. The numerals in Figure 3 that are the same as the numerals of Figure 1 indicate the same component parts. For purposes of simplicity the apparatus shown in Figure 1 for deriving the color switching wave and for deriving the keying wave have both been omitted and the drawing therefore only shows the coupling circuit for combining the video signals and the keying wave at the grid of the color kinescope.

The keying wave is developed across the RF load circuit of the amplifier 41 that is comprised of the condenser 44 and the inductance 43. A bypass condenser 52 establishes the side of the RF load circuit at ground for the frequency of the keying wave 3Fs. As in the arrangement of Figure 1, the RF load circuit is tuned to parallel resonance at the frequency 3Fs. A link coupling 65 comprising inductances 67 and 69 serves to energize the inductance 49 with the keying waves in the RF load circuit. One end of the inductance 49 is connected to the control grid 29′ of the color kinescope, and the other end is coupled to the source of video signals at the receiver 11. Just as in the coupling circuit of Figure 1, the inductance 49 and the distributed capacitance 50 of the control grid form a series circuit that is resonant at the keying frequency. Therefore, as explained in connection with Figure 1, the keying wave appears between the grid and cathode of the kinescope at a substantial amplitude. The inductance 49 is a low impedance for video frequencies and consequently they reach the grid 29′ without much attenuation. The low impedance of the inductance 49 to video frequencies and the well known action of the type of coupling provided by the link 65 combine to prevent much of the video signals from affecting the source of keying waves, the latter source in this particular embodiment being the amplifier 41 and its associated components.

In the arrangement of Figure 1, one end of the inductance 45 was grounded so that voltage of keying frequency induced therein had a loop to flow in. However, in the arrangement of Figure 3, the voltage of keying frequency is induced directly in the coil 49 by the link 65. The closed loop for the currents of keying frequency that flow in response to this induced voltage would normally be through the source of video signals in the receiver. This can be prevented by connecting a series circuit comprised of an inductance 54 and a variable condenser 55 between the output of the receiver 11 and ground. If the series circuit is tuned to series resonance at the frequency of the keying waves supplied by the link 65, then these waves are bypassed around the source of video signals.

If need be, a condenser 56 can be connected in parallel with the inductance 49. The condenser 56 effectively parallels the distributed capacitance 50 for the keying frequency as the series circuit comprised of the condenser 55 and the inductance 54 presents a very low impedance at this frequency. Thus in addition to preventing the keying frequency from interfering with the source of video signals in the receiver 11, it also permits a wider variation in the size of the inductance 49. When the condenser 56 is employed, it is in parallel with the distributed capacitance 50, as previously stated, and the value of the inductance 49 is such as to produce resonance with the condenser 56 and the capacitance 50 at the keying frequency.

Figure 3 also illustrates another type of single beam tube for reproducing images in color wherein a color switching wave may be employed to direct the beam to the proper colors in synchronism with the sequential representation of these colors by the incoming signal. This particular tube is described in detail in a U. S. patent application Serial No. 134,453, filed December 22, 1949, in the name of Paul K. Weimer, now Patent No. 2,650,-264. For the purposes of convenience however a brief description of the operation of this tube is presented. The beam of electrons is directed by a gun 57 towards an apetured plate 58 that is at 45° with respect to the central position of the beam. The apertures in the plate 58 are parallel slits 59 and they may be curved or straight, depending on the particular design of the tube. On the side of the plate 58, remote from the electron gun 57 and in between the parallel slits 59 are parallel strips 60, 61 and 62 of phosphor that respectively reproduce red, green and blue primary colors when struck by the beam of electrons. The electrons forming the beam pass through one of the slits 59 and are repelled back to one or another of the phosphor strips depending on the potential applied to an electron mirror 63. There is a substantial distributed capacitance between the electron mirror 63 and other elements in the tube and this may be represented by dotted capacitance 64. This capacitance is shown as existing between the electron mirror 63 and ground but it would be realized by those skilled in the art that the capacitances, for example, that exit between the electron mirror 63 and the plate 58 may eventually be referred to ground as far as A. C. potentials are concerned. Whereas two different types of single beam color reproducing tubes have been shown and described, it will be realized by those skilled in the art that this same problem may exist in other types of color tubes and employing a single beam of electrons and that the problem can be solved in accordance with the principles of this invention.

What is claimed is:

1. Apparatus for coupling a keying wave and a video signal to the grid of a kinescope in such manner that the keying wave and the video signal are added in a predetermined mutual phase relation in linear fashion comprising in combination a source of keying waves, a source of video signals, an inductance having one end coupled to the grid of the kinescope, said inductance forming with at least the inherent distributed capacity of said grid circuit, a circuit that is resonant to the frequency of said keying wave, means for coupling said keying waves from their source to said grid via said inductance and means for coupling said video signals from their source to said grid via said inductance.

2. Apparatus as described in claim 1 wherein the coupling means between said source of keying waves and said inductance presents a high impedance to said video signals and a low impedance to said keying waves so as to isolate the source of said keying waves from said video signals.

3. Apparatus as described in claim 1 wherein said coupling means between said source of keying waves and said inductance is an electromagnetic link.

4. Apparatus as described in claim 1 wherein said coupling means between said source of keying waves and said inductance is comprised of a transformer coupling to said source, said transformer having a primary across which the keying waves are developed, said transformer also having a secondary, one end of said secondary being connected to the cathode of said kinescope, and a series resonant circuit coupled between the other end of said secondary and the end of said inductance that is remote from said grid.

5. A coupling arrangement whereby a keying wave and a video signal may be added in a predetermined mutual phase relation in linear fashion and applied to the grid of a tube having an inherent distributed capacitance, comprising in combination a cathode ray tube adapted to form images in color, said tube having a control grid and a cathode, an inductance having one end connected to said grid, said inductance forming with at least the inherent distributed capacitance of said grid a series resonant circuit that is tuned to the frequency of said keying waves, a source of keying waves, another series resonant circuit that is tuned to the frequency of said keying waves, said latter series resonant circuit being connected between the source of keying waves and the other end of said inductance, and a source of video waves, the output of said latter source being coupled to said other end of said inductance.

6. A coupling arrangement comprising in combination a source of keying waves, an amplifier having an input and an output circuit, said input circuit being coupled to said source, said output circuit having a condenser and inductance connected in parallel so as to form a parallel resonant circuit that is tuned to the frequency of said keying waves, a kinescope having a grid and a cathode, an inductive winding coupled to the inductance of said parallel resonant circuit, one end of said winding being coupled to said cathode, a series circuit that is resonant to the frequency of said keying waves and an inductive impedance connected in series between the other end of said inductive winding and the grid of said kinescope, said inductive impedance forming a series circuit resonant to the frequency of said keying waves with the inherent distributed capacity of said grid, and a source of video signals, and means including said inductive impedance for applying video signals from said latter source to said grid.

7. A coupling arrangement comprising in combination a first inductance, means for producing waves of keying frequency across said first inductance, a utility device having a control grid and a cathode, a source of video signals having an output circuit, a second inductance coupled between said grid and said output circuit, a closed link coupling coupled between said first and second inductances, said second inductance and the inherent distributed capacity of said grid forming at least part of a series resonant circuit that is tuned to the frequency of said keying waves, and a series resonant circuit that is tuned to the frequency of said keying waves, said latter series resonant circuit being coupled between said output circuit and said cathode.

8. Apparatus as described in claim 7 wherein a capacitor is coupled in parallel with said second inductance.

References Cited in the file of this patent

UNITED STATES PATENTS

| | | |
|---|---|---|
| 2,034,704 | Nakashima et al. | Mar. 24, 1936 |
| 2,274,710 | Knoop | Mar. 3, 1942 |
| 2,282,992 | Deserno | May 12, 1942 |
| 2,296,050 | Poch | Sept. 15, 1942 |
| 2,522,967 | Shaw | Sept. 19, 1950 |
| 2,594,567 | Landon | Apr. 29, 1952 |
| 2,688,712 | Procter | Sept. 7, 1954 |

OTHER REFERENCES

Rider's TV Manual, vol. 6, RCA page 6-43, 44.